United States Patent
Booss et al.

(10) Patent No.: US 8,024,355 B2
(45) Date of Patent: Sep. 20, 2011

(54) DYNAMIC CAPACITY DEMAND PROFILE CONSTRUCTION WITH A PERSISTED CAPACITY DEMAND PROFILE AND A COLLISION BUFFER

(75) Inventors: Daniel Booss, Wiesloch (DE); Volkmar Soehner, Sinsheim (DE); Andrei Suvernev, Baiertal (DE); Stephan Weber, Heidelberg (DE)

(73) Assignee: SAP AG, Walldorf (DE)

( * ) Notice: Subject to any disclaimer, the term of this patent is extended or adjusted under 35 U.S.C. 154(b) by 1973 days.

(21) Appl. No.: 11/027,872

(22) Filed: Dec. 29, 2004

(65) Prior Publication Data

US 2006/0143062 A1 Jun. 29, 2006

(51) Int. Cl.
*G06F 7/00* (2006.01)
(52) U.S. Cl. .................................. 707/781; 707/802
(58) Field of Classification Search .................. 707/781, 707/802
See application file for complete search history.

(56) References Cited

U.S. PATENT DOCUMENTS

| | | | | |
|---|---|---|---|---|
| 4,698,752 A * | 10/1987 | Goldstein et al. | ............. | 707/704 |
| 4,937,743 A * | 6/1990 | Rassman et al. | ................... | 705/8 |
| 5,212,788 A * | 5/1993 | Lomet et al. | ............................ | 1/1 |
| 5,369,570 A * | 11/1994 | Parad | ................ | 705/8 |
| 5,878,414 A * | 3/1999 | Hsiao et al. | ................... | 707/648 |
| 6,192,370 B1 | 2/2001 | Primsch | | |
| 6,226,623 B1 * | 5/2001 | Schein et al. | ................... | 705/35 |
| 6,412,034 B1 * | 6/2002 | Chan | ............. | 710/200 |
| 6,477,660 B1 * | 11/2002 | Sohner | ............... | 714/1 |
| 6,578,005 B1 * | 6/2003 | Lesaint et al. | ................... | 705/8 |
| 6,665,783 B2 * | 12/2003 | Zahir | ............. | 711/165 |
| 6,769,003 B2 * | 7/2004 | Park et al. | ...................... | 707/703 |
| 7,089,253 B2 * | 8/2006 | Hinshaw et al. | ............. | 707/703 |
| 7,107,274 B2 * | 9/2006 | Sekiguchi et al. | ............ | 707/781 |
| 7,151,973 B1 * | 12/2006 | Moll | ............................ | 700/100 |
| 7,237,147 B2 * | 6/2007 | Ganesh et al. | .................. | 714/16 |
| 7,243,088 B2 * | 7/2007 | Verma et al. | .................. | 707/695 |
| 7,246,123 B2 * | 7/2007 | Carr et al. | ............................ | 1/1 |
| 7,500,241 B1 * | 3/2009 | Flockhart et al. | ............. | 718/102 |
| 7,587,428 B2 * | 9/2009 | Barabas et al. | ....................... | 1/1 |
| 7,707,195 B2 * | 4/2010 | Nettleton et al. | ............. | 707/704 |
| 7,721,288 B2 * | 5/2010 | Wu et al. | ....................... | 718/101 |
| 2002/0083166 A1 * | 6/2002 | Dugan et al. | .................. | 709/223 |
| 2002/0138483 A1 * | 9/2002 | Bretl et al. | ........................ | 707/8 |

(Continued)

OTHER PUBLICATIONS

Wilson, Armand, "Distributed Transactions and Two-Phase Commit", SAP White Paper, Copyright 2003, 39 pages, accessed online at <http://www.sdn.sap.com/irj/scn/go/portal/prtroot/docs/library/uuid/3732d690-0201-0010-a993-b92aab79701f?QuickLink=index &overridelayout=true> on Oct. 8, 2010.*

(Continued)

*Primary Examiner* — Hung T Vy
*Assistant Examiner* — Phuong-Thao Cao
(74) *Attorney, Agent, or Firm* — Schwegman, Lundberg & Woessner, P.A.

(57) ABSTRACT

A method is described that involves locking a capacity demand profile of a resource for the use of a transaction. The method also involves obtaining a portion of the locked capacity demand profile. The portion describes the capacity demand profile over a time interval in which a locked out transaction desired to implement a change to the capacity demand profile prior to the locking. The method involves implementing the change to the portion to form a changed portion. The method also involves, after the implementing, implementing a second change to the changed portion. The second change is desired by the transaction.

36 Claims, 12 Drawing Sheets

U.S. PATENT DOCUMENTS

| | | | |
|---|---|---|---|
| 2003/0046396 A1* | 3/2003 | Richter et al. | 709/226 |
| 2003/0083919 A1* | 5/2003 | Hammann | 705/8 |
| 2004/0015587 A1* | 1/2004 | Kogut-O'Connell et al. | 709/226 |
| 2004/0068501 A1* | 4/2004 | McGoveran | 707/8 |
| 2004/0139116 A1* | 7/2004 | Porter | 707/104.1 |
| 2004/0187152 A1* | 9/2004 | Francis et al. | 725/58 |
| 2004/0216107 A1* | 10/2004 | Somogyi et al. | 718/100 |
| 2004/0220913 A1* | 11/2004 | Walker | 707/3 |
| 2004/0225636 A1* | 11/2004 | Heinzel et al. | 707/1 |
| 2004/0267747 A1* | 12/2004 | Choi et al. | 707/8 |
| 2005/0010572 A1* | 1/2005 | Clark et al. | 707/10 |
| 2005/0102250 A1* | 5/2005 | Carr et al. | 707/1 |
| 2005/0102554 A1* | 5/2005 | Zohar et al. | 714/6 |
| 2005/0149526 A1* | 7/2005 | Wiser et al. | 707/8 |
| 2005/0181789 A1* | 8/2005 | Yach et al. | 455/433 |
| 2005/0234974 A1* | 10/2005 | Bailey et al. | 707/103 R |
| 2005/0235137 A1* | 10/2005 | Barr et al. | 713/1 |
| 2005/0273507 A1* | 12/2005 | Yan et al. | 709/223 |

OTHER PUBLICATIONS

Technical Documentation "ALLBASE/SQL Reference Manual: HP 9000 Computer Systems" Hewlett Packard, 1999, pp. 169-202, accessed online at <http://docs.hp.com/en/36217-90408/36217-90408.pdf> on Oct. 8, 2010.*

Ryu et al., "Performance Analysis of Dynamic Locking with the No-Waiting Policy", IEEE Transactions on Software Engineering, vol. 16, No. 7, Jul. 1990, pp. 684-698.*

* cited by examiner

US 8,024,355 B2

DYNAMIC CAPACITY DEMAND PROFILE CONSTRUCTION WITH A PERSISTED CAPACITY DEMAND PROFILE AND A COLLISION BUFFER

FIELD OF INVENTION

The field of invention pertains to information systems; and, more specifically, to dynamic capacity demand profile construction with a persisted capacity profile and collision buffer.

BACKGROUND

Prior Art Scheduling System

Certain software applications are designed to comprehend complicated scheduling tasks. For example, a supply-chain-management (SCM) software application is typically designed to comprehend the resources in a supply chain (e.g., raw materials, manufacturing equipment, distribution, warehousing, etc.) and schedule their usages (also referred to as "activities") so that a specific "supply" of product can be provided at one or more places at specific times.

FIG. 1 shows a prior art application server 101 architecture that includes SCM application software 102. The SCM application software 102 includes a scheduler function 103 that is responsible for scheduling specific activities on specific resources. As an example, if the SCM application 102 were used to schedule activities for a manufacturing facility, the SCM application 102 might contemplate the sequence of tools that form the manufacturing facility's production line (s); and, in light of specific production/purchase orders, require the scheduler 103 to schedule specific activities on the specific tools in order to satisfy these orders.

For any activity that is scheduled on a resource, the activity can be characterized in terms of its "time interval" and its "capacity demand". The activity's "time interval" is the time period over which the resource is dedicated to the activity. An activity's "capacity demand" is the amount of the resource's capacity that the activity consumes (at a particular instant of time). For example, if the above referred to manufacturing facility where a bakery and the particular resource where an oven, the baking of a "batch" of baked goods could be associated with an activity requiring a specific bake start time and bake end time (which defines the activity's time interval) as well as a specific amount of internal oven space (which corresponds to the activity's capacity demand).

The scheduler 103 is responsible for properly determining appropriate start and end times for an activity in light of the delivery time of the activity's respective production/purchase order, the activity's capacity demand, and the maximum capacity of the resource. In the prior art approach of FIG. 1, in order to properly perform its scheduling function, the scheduler 103 uses a "capacity demand profile" for a resource over a "time interval of interest".

The scheduler's "time interval of interest" is often a time interval within which a new activity, yet to be scheduled, needs to be scheduled in order to satisfy the activity's respective production/purchase order. The capacity demand profile describes the resource's utilization over time and is constructed from those activities that have already been scheduled on the resource and that at least partially overlap in time with the time interval of interest. With an understanding of the resource's capacity demand profile over the time interval of interest, and with consideration given to the maximum capacity of the resource, the scheduler 103 determines if the resource has sufficient available capacity anywhere within the time interval of interest to entertain the scheduling of the new activity.

FIG. 1 outlines a specific example that demonstrates the operation of a prior art system. Referring to FIG. 1, a database 104 contains a persisted representation of the capacity demand profile for the resource R. For the sake of example, assume the scheduler 103 desires to schedule a new activity on resource R somewhere within a time interval of interest of 3.0 to 9.0 time units.

According to the prior art system of FIG. 1, the scheduler 103 will read from database 104 the portion 106 of the persisted capacity demand profile that is implicated by the 3.0 to 9.0 time interval of interest and store it in memory space 107 that is local to the application 102 (e.g., the system memory of the application server 101 that hosts the application 102). The capacity demand profile portion 106 has a "data point" for each change imparted to the resource's capacity demand that results from the starting and/or ending of one or more scheduled activities within the time interval of interest.

The specific capacity demand profile portion 106 of FIG. 1 consists of data points 1 through 5 that represent capacity demand changes resulting from the start/end times of already scheduled activities A1, A2 and A3 (which have [start time (s); end time (e); capacity demand ($C_D$)] characteristics of [2.0;4.0;1.0], [5.0;9.0;1.0], and [7.0;8.0;2.0], respectively). Note that data points 1 through 5 outline a profile with capacity demand extending along the vertical axis and time extending along the horizontal axis. Thus, a capacity demand profile data point can generally be given as a coordinate value of (t,c) where t is time and c is capacity demand.

Once the relevant portion of the capacity demand profile 106 is retrieved, the scheduler 103 compares the retrieved portion 106 of the capacity demand profile against the maximum capacity of the resource and the capacity demand of a new activity that desires to be scheduled (or an already scheduled activity that desires to be changed). The new activity is scheduled on the resource if within the time interval of interest the resource has available capacity that is greater than or equal to the capacity demand of the new activity over a length of time that is equidistant or longer than the time interval of the new activity (where, "available capacity" is the difference between the resource's maximum capacity and the capacity demand profile). Otherwise, the scheduling of the new activity is rejected at least over the time interval of interest. If the new activity is scheduled, the capacity demand profile portion is updated to reflect the addition of the new activity and then stored in the database.

A problem with the prior art system of FIG. 1 is that it does not easily scale so as to support the continued execution of multiple transactions that simultaneously desire access to the same capacity demand profile data in database 104. According to the basic operation of the prior art system of FIG. 1, while a transaction has access to a specific capacity demand profile portion, the specific portion in database 104 is "locked" such that any other transactions that desire access to any data of the same portion are "locked-out" resulting in their being "dropped" or delayed depending on their configuration.

Object-Relational Database Management Systems

In an implementation, database 104 is an object-relational database management system (ORDBMS). An ORDBMS can be viewed as a traditional "tabular" relational database that has been extended with an object-oriented processing environment so that complicated data structures can be easily persisted. As an example, use of an ORDBMS database 104 permits easy persistence of representations of the supply chains that the SCM application 102 is responsible for managing.

Here, a supply chain can often be viewed as a complex "state diagram" or network of activities and resources that a traditional tabular database would have trouble efficiently persisting and/or performing functions upon. By including object-oriented processing along with traditional tabular database functions, an ORDBMS database 104 can easily represent a supply chain with a collection of objects that are referenced to one another as appropriate to reflect the supply chain's complex network. From the perspective of an application that desires to use a particular supply chain representation, the specific objects that make up the representation could be kept in a container that is locked/unlocked (e.g., through use of a semaphore) by the application to perfect the supply chain representation's isolation.

In a specific ORDBMS database 104 implementation, object oriented models are kept by the ORDBMS database 104 for specific complex data structure types, and, the specific data for a specific representation is persisted with the ORDBMS database's traditional database function. For example, in order to form the object oriented representation for a specific supply chain, the specific activities and resources of the specific supply chain are mapped from a traditional table into an object oriented model for a supply chain. Processes may then be performed in an object oriented environment upon the object oriented representation (e.g., a change made to the supply chain) within database 104 and/or within the application 102. More details about such a "model based" ORDBMS database may be found in U.S. Pat. No. 6,192,370 B1 entitled "Method and System For Rapid Memory-Resident Processing Of Transactional Data".

Open and Closed Numeric Range Notation

Certain notation is used to specify numeric ranges. Specifically, parenthesis are used to indicate an "open" end of a numeric range and brackets are used to indicate a "closed" end of a numeric range. For example, the notation (5,6) would be used to specify a range between 5 and 6 exclusive (i.e., 5 and 6 are not included in the range). As another example, the notation [5,6] would be used to specify a range between 5 and 6 inclusive (i.e., 5 and 6 are included in the range). Consistent with the above, the notation [5,6) would be used to specify a range between 5 and 6 that includes 5 but not 6; and, the notation (5,6] would be used to specify a range between 5 and 6 that includes 6 but not 5.

SUMMARY

A method is described that involves locking a capacity demand profile of a resource for the use of a transaction. The method also involves obtaining a portion of the locked capacity demand profile. The portion describes the capacity demand profile over a time interval in which a locked out transaction desired to implement a change to the capacity demand profile prior to the locking. The method involves implementing the change to the portion to form a changed portion. The method also involves, after the implementing, implementing a second change to the changed portion. The second change is desired by the transaction.

FIGURES

The present invention is illustrated by way of example and not limitation in the figures of the accompanying drawings, in which like references indicate similar elements and in which:

FIGS. 4a and 4b show a local capacity demand profile after a first set of s,e,c data from the collision buffer has been accounted for;

FIGS. 5a and 5b show the local capacity demand profile of FIG. 4b after a second set of s,e,c data from the collision buffer has been accounted for;

FIGS. 6a and 6b show the local capacity demand profile of FIG. 5b after a third set of s,e,c data from the collision buffer has been accounted for;

FIGS. 7a, 7b and 7c show the local capacity demand profile of FIG. 6b after a fourth set of s,e,c data from the collision buffer has been accounted for;

FIGS. 8a and 8b show the local capacity demand profile of FIG. 7c after a fifth set of s,e,c data from the collision buffer has been accounted for;

DETAILED DESCRIPTION

Overview

Figure 1:
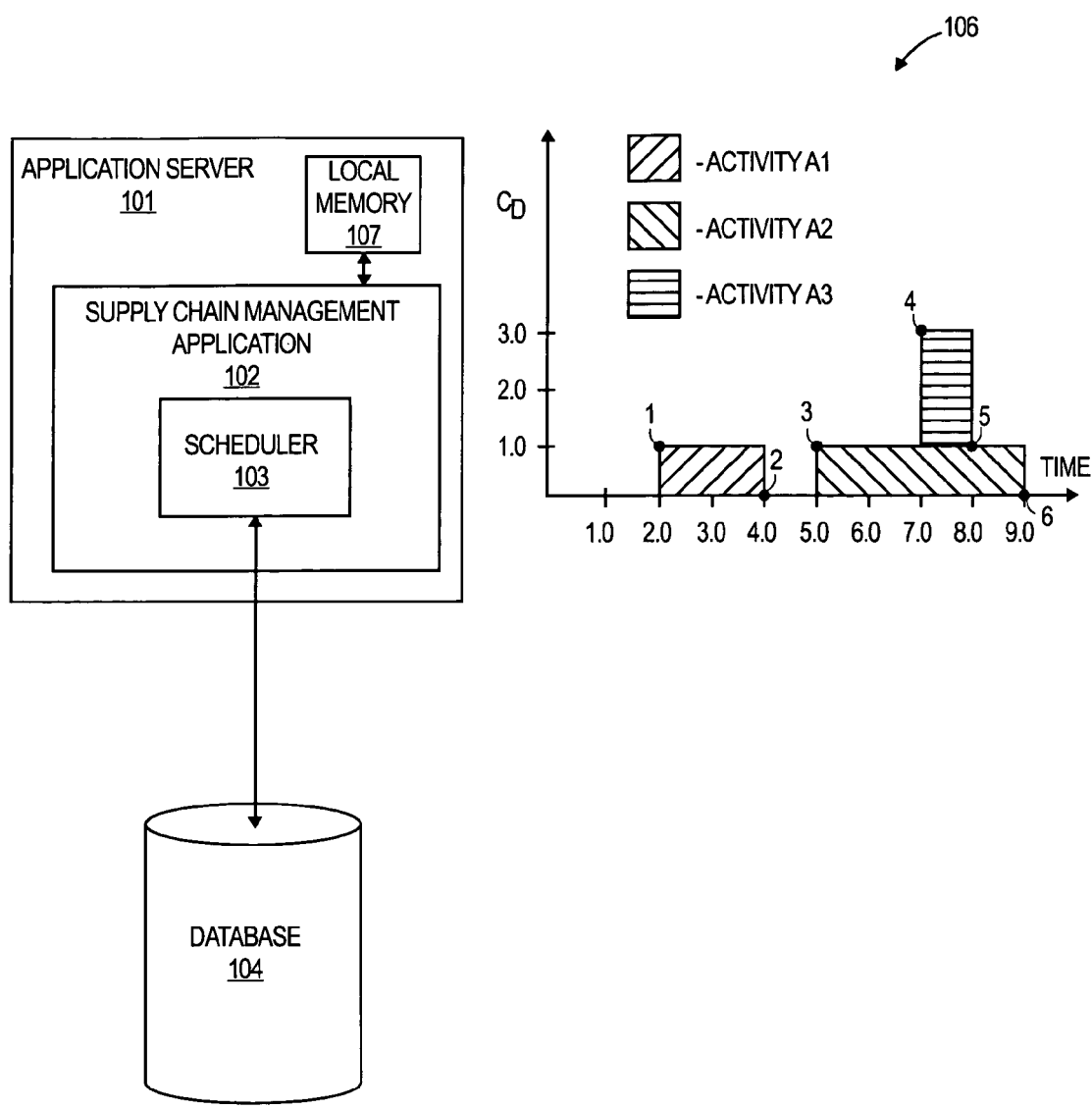
FIG. 1 shows a prior art architecture for scheduling activities on a resource.
Figure 2:
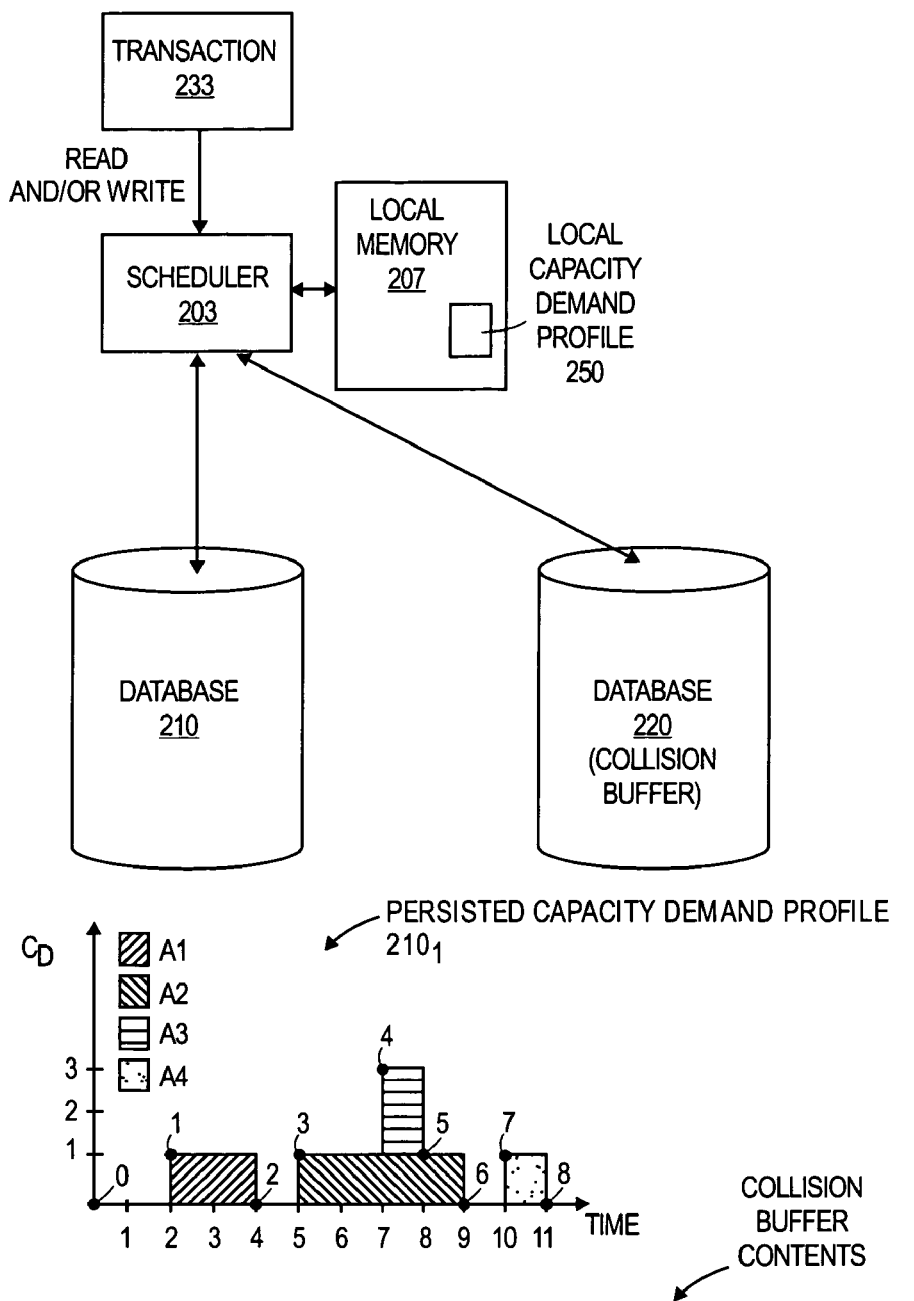
FIG. 2 shows an improved architecture for scheduling activities on a resource.

Recall from the discussion in the Background that a problem with the prior art system of FIG. 1 is that it does not easily support the continued execution of multiple transactions that simultaneously desire the use of the same data from database 104. FIG. 2, by contrast, shows an improved scheduling architecture. According to the improved architecture of FIG. 2, the contents 221 through 225 of a collision buffer 220 represent the ability of the system of FIG. 2 to allow "locked out" transactions to continue their execution without being delayed or dropped.

As will be described in more detail below, "locked out" transactions will load into the collision buffer 220 desired change(s) to a resource's locked, persisted capacity demand profile that reflect the locked out transactions' desire to add, remove or change specific scheduled activities. These locked out transactions then continue their operation "as if" these changes were successfully implemented. The result is that the "locked out" transactions should suffer no significant delay if in fact the desired changes that were entered in the collision buffer 220 are successfully implemented.

Referring to FIG. 2, an exemplary representation of a resource's persisted capacity demand profile $210_1$ (which may also be referred to as "the persisted profile") is illustrated. The persisted profile $210_1$ is stored in database 210 and the update data 221 through 225 are stored in a collision buffer $250_1$ that is implemented with database 220. According to an embodiment, a separate persisted capacity demand profile and persisted collision buffer is maintained for each resource contemplated by the scheduling system. In practice, database 220 may simply be another table in the same database 210 that the persisted capacity demand profile $210_1$ is kept. However, for ease of understanding the applicable processes that are described in more detail further below, two separate databases 210, 220 are shown.

Figure 3:
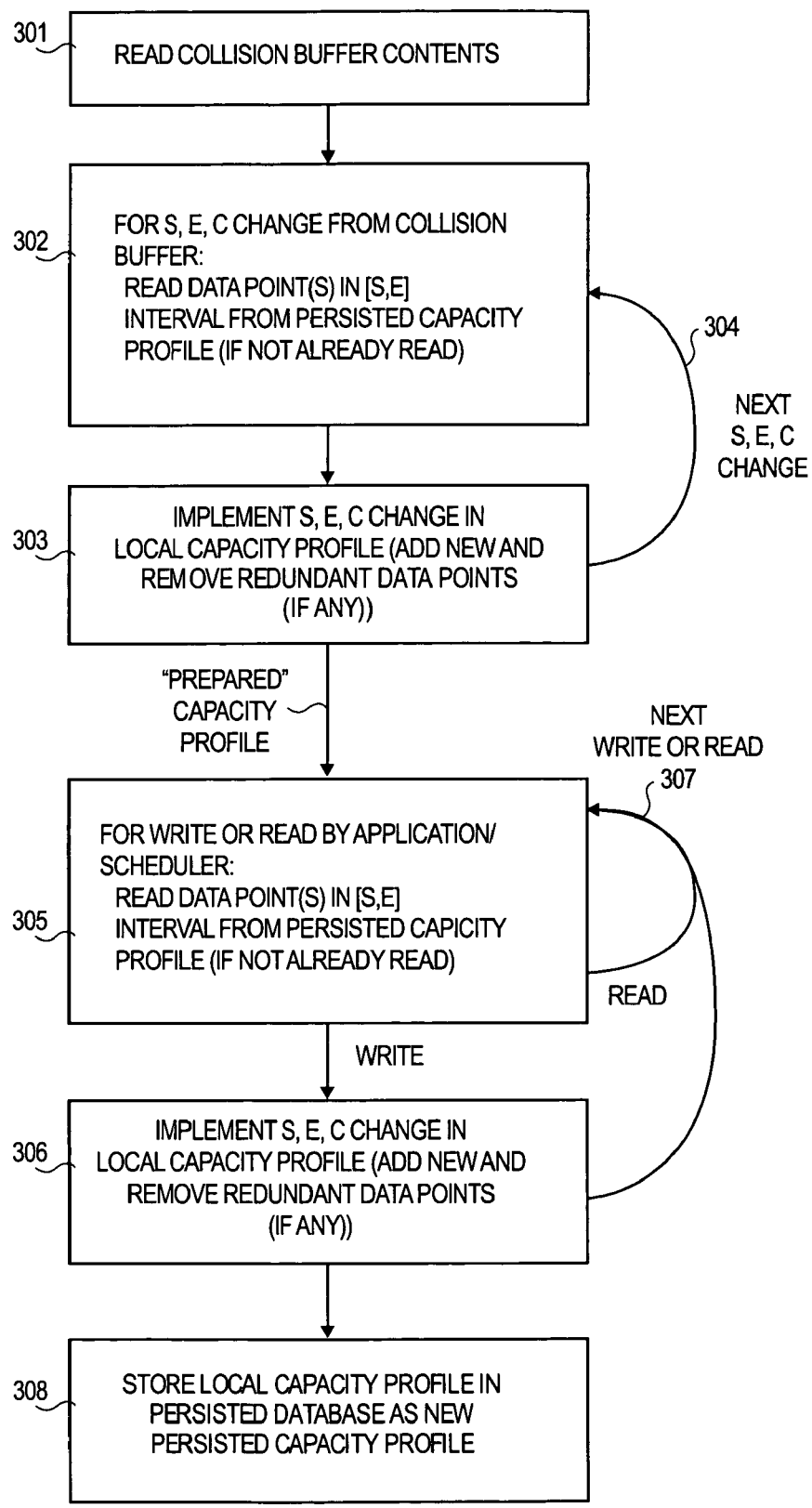
FIG. 3 shows a methodology that can be performed by the improved scheduling architecture of FIG. 2.

FIG. 3 shows a methodology that can be executed by the scheduling system of FIG. 2. A thorough description of the execution of methodology of FIG. 3 is explained by way of example through reference to FIG. 2 and FIGS. 4a,b through FIG. 11. However, before discussing FIGS. 4a,b through FIG. 11 in detail, an overview of the methodology of FIG. 3 will first be presented. As a starting point, referring to FIGS. 2 and 3, a transaction 233 is assumed to have a need to understand at least a portion of a capacity demand profile portion for a resource "R".

The transaction 233 may have been created, for example, to fulfill a production and/or purchase order that requires the use of resource R. Note that other transactions created for other production/purchase orders that also require the use of resource R may exist in parallel with transaction 233. As alluded to above, the ability to support the continued execution of one or more transactions that simultaneously develop a desire to affect data of the same capacity demand profile for a particular resource is one of the features of the improved architecture of FIG. 2.

In an embodiment, at any time, the entire persisted profile $210_1$ of the resource is available for the use of only one transaction that scheduler 203 acts on behalf of. Thus, a lock is placed on the entire profile $210_1$ while a particular transaction has ownership of it (e.g., to schedule an activity). In a further embodiment, ownership of the entire persisted capacity profile $210_1$ is given to the first transaction to request access to it while it is unlocked. In the example of FIG. 2, the transaction that has been given ownership of resource R's entire persisted capacity profile $210_1$ is transaction 233. Referring to FIG. 3, because transaction 233 has been given ownership of the persisted capacity profile $210_1$, scheduler 203 will follow process flow 310 (i.e., process flow 301 through 308) on behalf of transaction 233.

Any other transactions that develop a desire to affect the capacity demand of resource R while transaction 233 maintains ownership of it's persisted capacity profile $210_1$ will load desired changes to the capacity demand of resource R into the collision buffer 220. Such changes may arise from the desire of these locked out transactions to: 1) add one or more "new" scheduled activities to resource R; 2) remove one or more already scheduled activities from resource R; and/or, 3) change a start time and/or end time of one or more activities already scheduled on resource R.

FIG. 3 depicts the loading 311 of desired capacity demand changes into collision buffer 220 by any such "locked-out" transaction(s). Thus, while transaction 233 has ownership of the persisted capacity demand profile $210_1$, scheduler 203 executes process flow 310 on behalf of transaction 233 and any transactions that are "locked out" from ownership of the persisted capacity demand profile $210_1$ will execute process flow 311.

Prior to the beginning of process flow 301, it is assumed that transaction 233 (or scheduler 203) has already requested and been given ownership of the persisted profile $210_1$ (i.e., the persisted profile $210_1$ is already locked). Transaction 233 maintains its ownership over the persisted profile $210_1$ (i.e., the persisted profile portion remains locked) until all changes to be made to the persisted profile $210_1$ by transaction 233 have been written into database 210 at process 308. Thus, a lock is maintained on the persisted profile $210_1$ from a time prior to process 301 to a time after process 308. Between these times, any transactions that develop a desire to affect the capacity demand of resource R will be "locked out" and must therefore write their desired change(s) 309 into the collision buffer 220.

Referring back to the beginning of process flow 310, once transaction 233 has been able to establish ownership of the persisted profile $210_1$, the desired changes 221 through 225 that were submitted by locked out transactions during the immediately prior use of profile $210_1$ (i.e., the use of profile $210_1$ immediately prior to transaction 233's present use of it) are loaded 301 into local memory 207 from the collision buffer 220.

Process sequence 302 through 304 corresponds to an iterative process that attempts to update the information stored in the persisted capacity demand profile $210_1$ with the desired changes 221 through 225 that were loaded 301 into local memory 207 from the collision buffer 220. The updates are made to capacity demand profile information resident in local memory 207 that may be referred to as the "local capacity demand profile" 250 for resource R.

Once all the desired changes 221 through 225 from the collision buffer 220 are accounted for (i.e., after the iterative processing of process flows 302 and 303 are complete), the local capacity demand profile 250 in local memory 207 is deemed "prepared" because it represents corrections to those regions of the persisted capacity demand profile $210_1$ that are stale. Better said, the desired changes 221 through 225 in the collision buffer 220 were entered before transaction 233 requested ownership of the persisted profile for the resource of concern.

Referring to FIG. 3, once the local capacity demand profile 250 is "prepared" (i.e., after the final execution of process 303 is performed), another potentially iterative process flow 305 through 307 entails in which all reads and/or writes performed upon the capacity demand profile of resource R on behalf of transaction 233 are executed.

A write would be made by scheduler 203 for transaction 233 in order to, for example, add a new scheduled activity upon resource R and/or to change the start time, end time or capacity demand of an existing scheduled activity on resource R. Each write corresponds to an additional change made to the capacity demand profile "on top of" those changes 221-225 from the collision buffer 220. As such, any writes made by the scheduler 203 on behalf of transaction 233 are added to the contents of the local capacity demand profile 250.

Once all reads and writes to the local capacity demand profile for resource R are performed for transaction 233, the contents of the local capacity profile 250 in local memory 207 are written 308 over the corresponding regions of the persisted capacity demand profile $210_1$ in database 210. At this point, the persisted capacity profile will be "up to date" with respect to the changes imparted from the collision buffer 220 and transaction 233.

Changes desired to be made to the capacity demand profile of resource R by transactions that were "locked out" while transaction 233 maintained its ownership of the persisted capacity demand profile will be buffered in collision buffer 220. These will be accounted for the next time the persisted capacity demand profile for resource R in database 210 is used. After the contents of the local capacity profile are successfully written into database 210 as described above with respect to process 308, the lock held on the persisted capacity demand profile for transaction 233 is released. Thereafter the persisted capacity demand profile for resource R waits in database 210 for its next use.

The discussion above indicates that when a transaction 233 maintains a lock on a persisted capacity demand profile for a particular resource, the scheduler 203 essentially executes a first phase in which changes from the collision buffer are installed (processes 302 through 304); and, a second phase in which one or more reads and/or writes originating from the transaction 233 with ownership of the persisted capacity demand profile are performed (processes 305 through 307). The changes to the capacity demand profile made in either phase are recorded in a local capacity demand profile 250. When all such changes are completed, the contents of the local capacity demand profile 250 overwrite corresponding data in database 210.

Figure 4A:
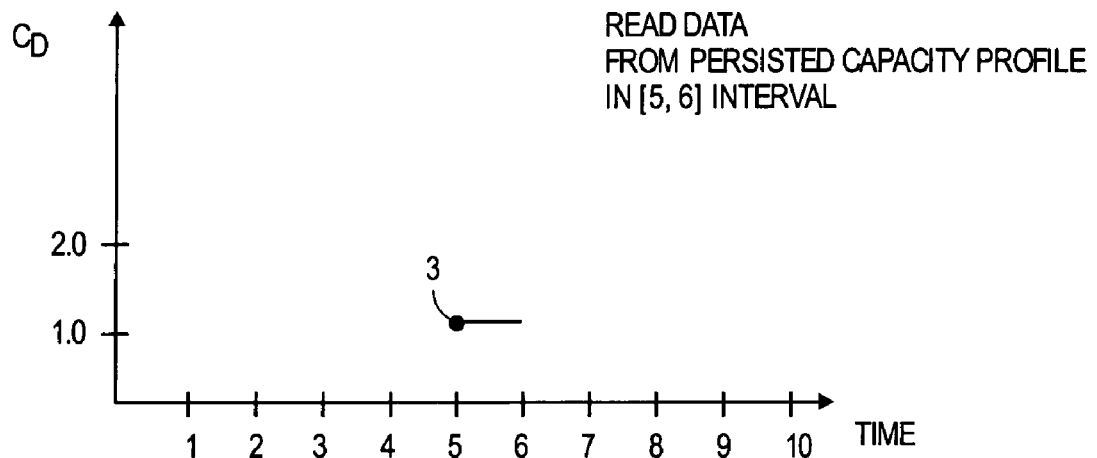
Figure 5A:
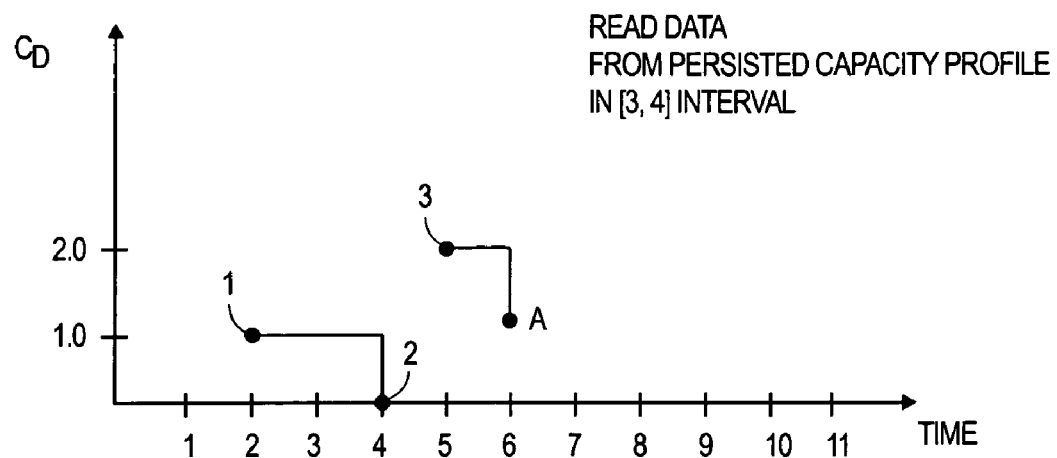
Figure 6A:
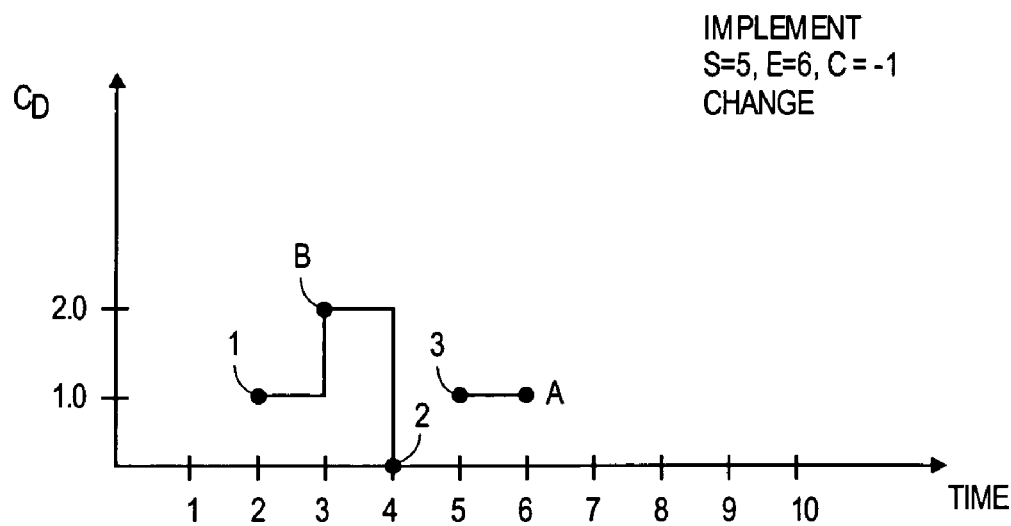
Figure 7A:
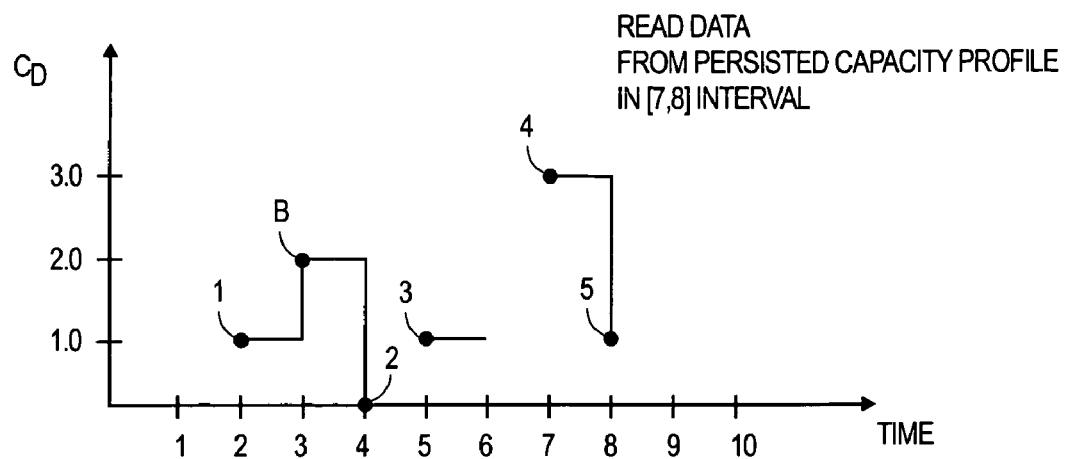

FIGS. 4a,b through 8a,b show the development of the local capacity demand profile 250 over the course of instituting the specific capacity demand changes 221 through 225 depicted in FIG. 2. That is, FIGS. 4a,b show the development of the local capacity demand profile 250 in response to change 221; FIGS. 5a,b show the development of the local capacity demand profile 250 in response to change 222; FIGS. 6a,b show the development of the local capacity demand profile 250 in response to change 223; FIGS. 7a,b,c show the development of the local capacity demand profile 250 in response to change 224; and, FIGS. 8a,b show the development of the local capacity demand profile 250 in response to change 225.

Figure 9:
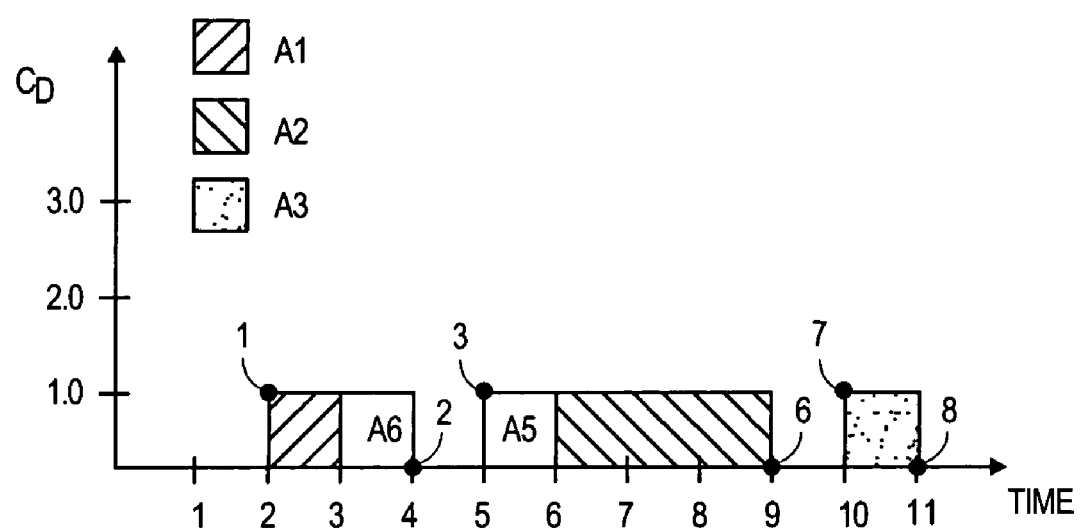
FIG. 9 shows the local capacity profile of FIG. 8b if a transaction with ownership of the persisted capacity demand profile desires to perform a read over time units 0.0 through 12.0 of the resource to which the local capacity demand profile, the persisted capacity demand profile and the collision buffer pertain.

FIGS. 9 and 10 relate to the aforementioned second phase in which the local capacity demand profile 250 is altered in response to read or write activity performed on behalf of the transaction 233 that maintains ownership over the persisted capacity demand profile. FIG. 9 shows the development of the local capacity demand profile 250 in response to a read request by transaction 233. FIG. 10 shows the development of the local capacity demand profile 250 in response to a write request by transaction 233.

Figure 10A:
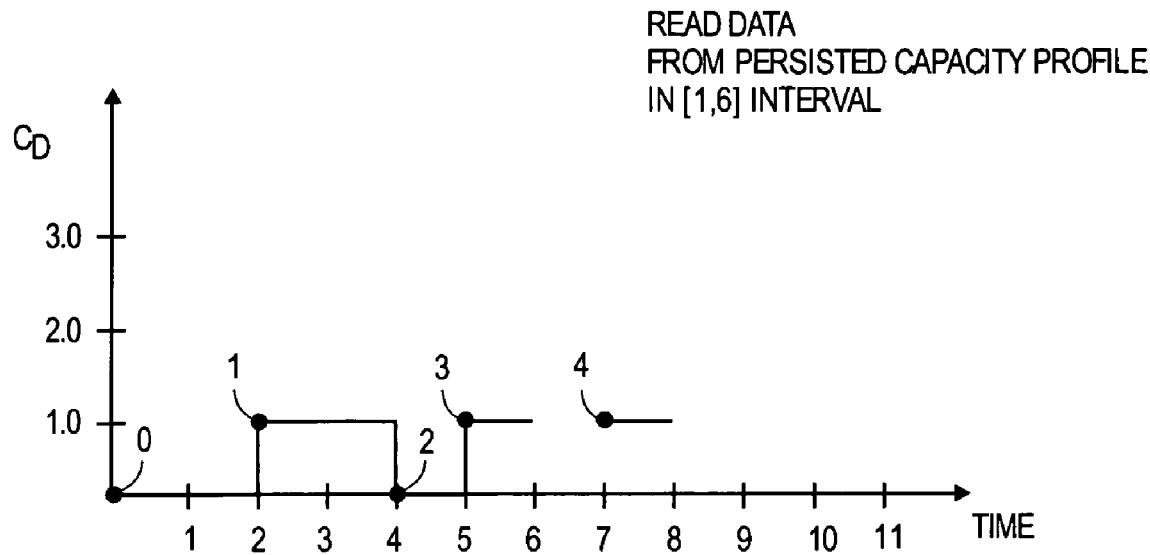
FIGS. 10a and 10b show the local capacity profile of FIG. 8b if a transaction with ownership of the persisted capacity profile desires to schedule a new activity (A7) upon the resource to which the local capacity demand profile, the persisted capacity demand profile and the collision buffer pertain.
Figure 10B:
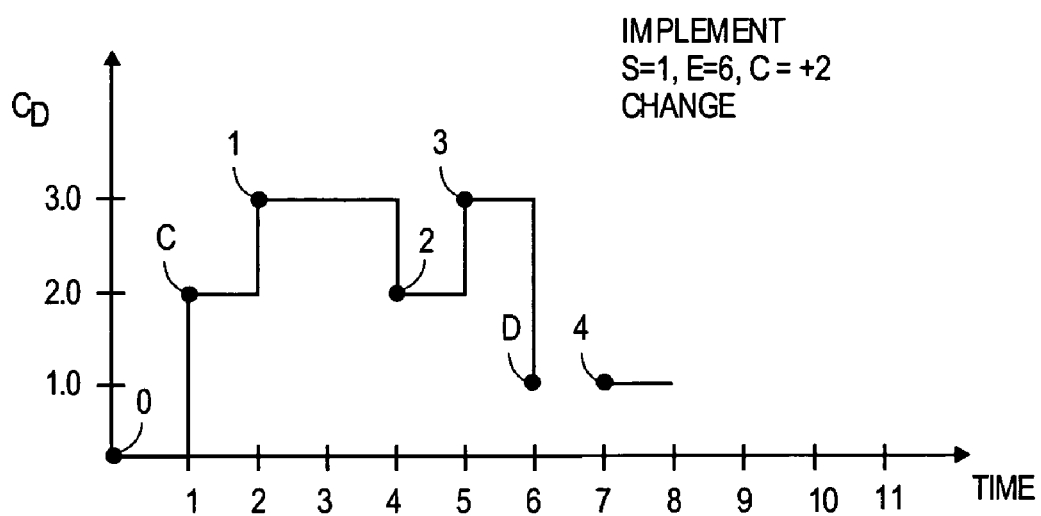
Figure 11:
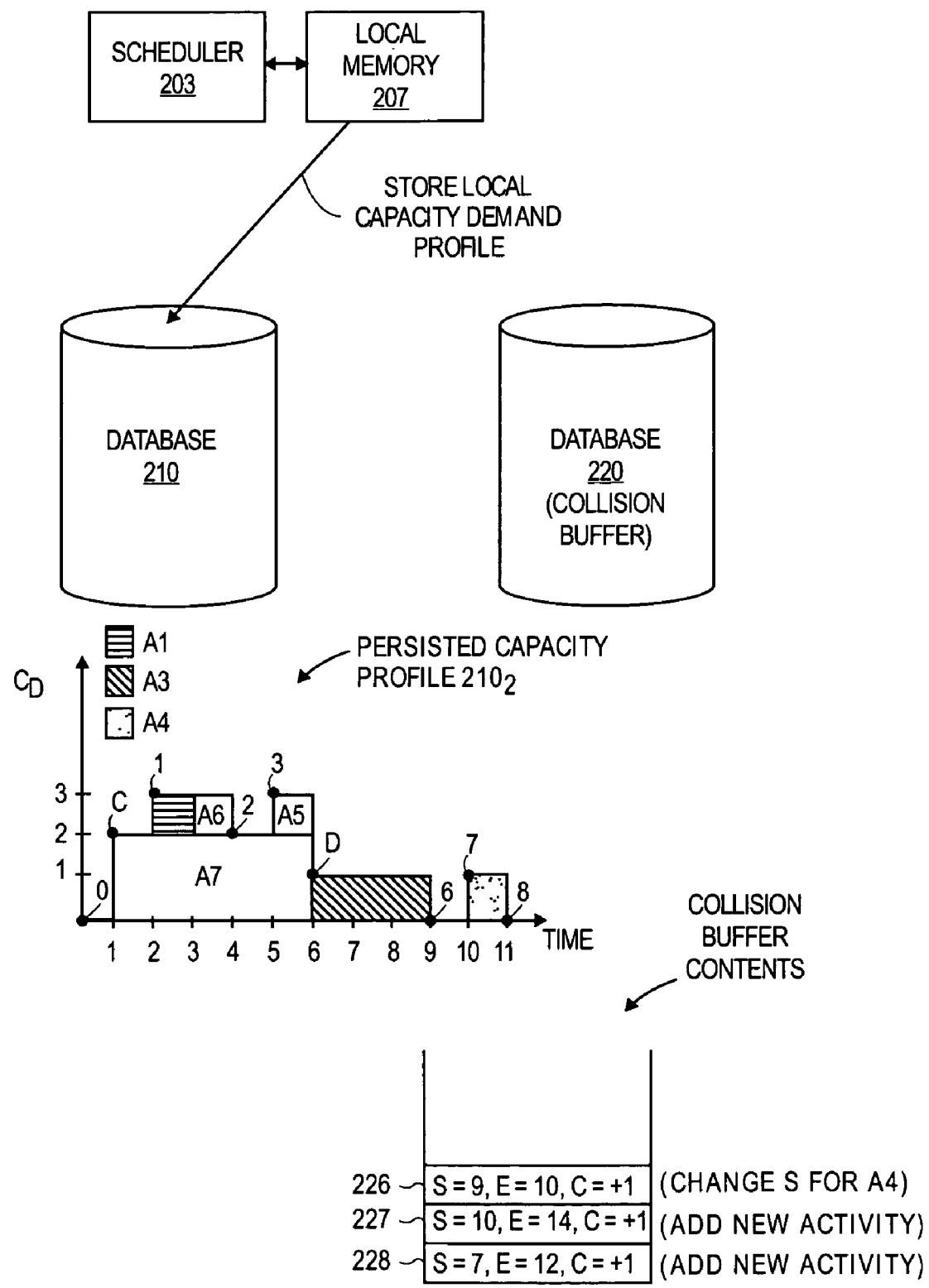
FIG. 11 shows the improved scheduling architecture of FIG. 2 after the persistent capacity profile $240_1$ of FIG. 2 has been updated with the local capacity demand profile information of FIG. 10b.

FIG. 11 shows an exemplary state of the system of FIG. 2 after the local capacity demand profile of FIG. 10 has been written into database (as the new "latest version" of the persisted capacity demand profile) after ownership of the persisted capacity demand profile for resource R has been relinquished or is imminent.

Figure 8A:
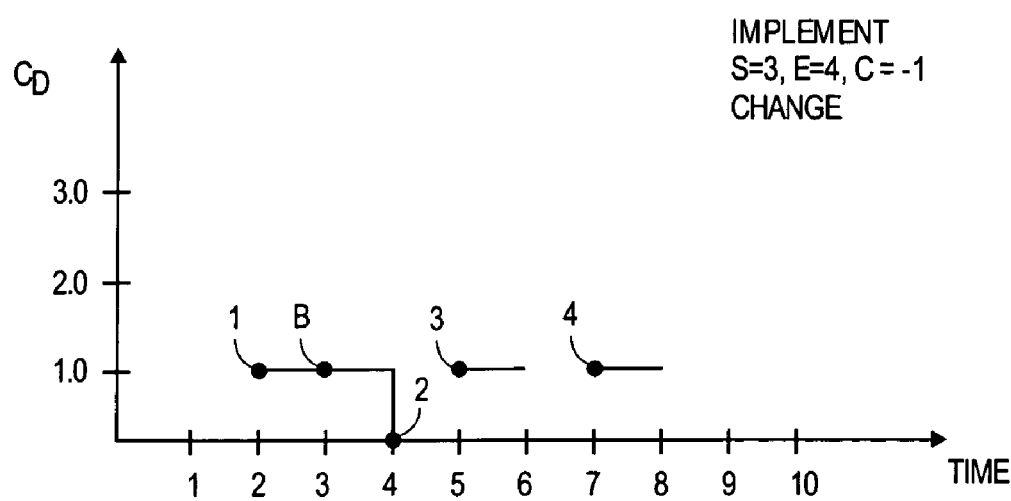

The following section "Implementation of Collision Buffer Entries" discusses FIGS. 4a,b through FIGS. 8a,b and methodologies 302 through 304 in detail. The section thereafter, "Read/Write By Owner Transaction" discusses FIGS. 9 through 11 and methodologies 305 through 308 in detail.

Implementation of Collision Buffer Entries

FIGS. 4a,b through 8a,b show the development of the local capacity demand profile 250 over the course of instituting the capacity demand changes 221 through 225 for resource R that are observed in the collision buffer 220. Each of changes 221 through 225 include a time interval [s,e) over which the change is effected and the magnitude "c" of the change itself ("s" being the closed start of the change's time interval; "e" being the open end of the change's time interval; here, reference to the Background section's discussion of open and close ended ranges is recommended). Thus, a capacity demand profile change can be defined by its "s,e,c" data. A discussion of the s,e,c data for each of changes 221 through 225 immediately follows.

Referring to the persisted capacity demand profile $210_1$ observed in FIG. 2, change 221 corresponds to the addition of a new activity A5 having a time interval of [5,6) and a capacity demand of 1.0. Change 222 corresponds to the addition of another new activity A6 having a time interval of [3,4) and a capacity demand of 1.0. Change 223 corresponds to a change in the start time of activity A2 from time 5.0 to time 6.0. Such a change corresponds to eliminating the capacity demand contributed by activity A2 in the [5,6) time interval. Because the capacity demand contributed by activity A2 is 1.0, the s,e,c data for change 223 is therefore (5,6,−1).

Change 224 corresponds to the removal of activity A3. Because activity A3 contributes a capacity demand of 2.0 over a [7,8) time interval, its removal is implemented by inserting a change of −2.0 over a time interval of [7,8). Hence the s,e,c data for change 224 is (7,8,−2). Change 225 corresponds to a change in the end time of activity A1 from time 4.0 to time 3.0. Such a change corresponds to eliminating the capacity demand contributed by activity A1 in the [3,4) time interval. Because the capacity demand contributed by activity A1 is 1.0, the s,e,c data for change 225 is therefore (3,4,−1).

According to the s,e,c capacity demand change syntax, the addition of a new activity, the moving of an activity start time to an earlier time, and, the moving of an activity end time to a later time will each impose a positive capacity demand change. By contrast, the removal of an already scheduled activity, the moving of an activity start time to a later time, and, the moving of an activity end time to an earlier time will each impose a negative capacity demand change.

For simplicity it is assumed with respect to the discussion of FIGS. 4a,b through FIGS. 8a,b that the collision buffer changes 221 through 225 are handled in a FIFO order. However, more sophisticated schemes may be designed in which changes from collision buffer 203 are handled in the order of decreasing time interval (i.e., changes covering the widest time interval are handled before changes covering a smaller time interval) to increase the probability that fewer reads from database 210 will be needed to fully implement all changes in the collision buffer.

Referring to FIGS. 4a,b and methodologies 302 through 304 in FIG. 3, the handling of change 221 in FIG. 2 is presently discussed. As discussed above, change 221 was made by a transaction that desired to add a new activity (A5) of capacity demand 1.0 in the [5,6) time interval. Referring to FIG. 3, in handling change 221, the data points in the persisted capacity profile $210_1$ within the time interval [5,6] are read 302 from database 210. Referring to persisted capacity profile $210_1$, there exists only one data point (data point 3 at time 5.0) that meets this criteria.

Therefore, only data point 3 is read 302 from database 210 and loaded into local memory 207 as part of the local capacity demand profile 250. FIG. 4a shows the "present understanding" within the local capacity demand profile 250 after the read 302 of data point 3 from database 210 is performed. Recall that the persisted capacity demand profile $210_1$ includes a data point for each change in the capacity demand profile of the corresponding resource (resource "R"). Therefore, for any capacity demand profile region, the lack of a data point means that there is no change in capacity demand until the "next" data point earlier in time ("on the left" according to the drawings of the present application) or later in time ("on the right" according to the drawings of the present application) is reached.

With respect to the read 302 of the persisted capacity demand profile $210_1$ within time interval [5,6] for change 221, the presence of only data point 3 at time 5.0 means that there exists a change in the capacity demand profile at time 5.0 that "finishes" at a capacity demand of 1.0, and that, no further change exists in the persisted capacity demand profile $210_1$ until some time after time 6.0.

Therefore FIG. 4a shows data point 3 (i.e., capacity demand profile coordinate value (5.0, 1.0)) and a solid line extending along a capacity demand value of 1.0 from time 5.0 to time 6.0 inclusive. It should be understood that in practical implementation, the lack of a data point within the [5,6) time interval would be interpreted to mean the capacity demand remains constant in the [5,6] time interval. Therefore no data representing the "solid line" is required in local memory 207 (i.e., data point 3 alone is sufficient to interpret the proper understanding). The solid line of FIG. 4a, as well as those observed in FIG. 4b through FIGS. 8a,b, are depicted simply to enhance the depth of understanding of the reader of the present application.

Figure 4B:
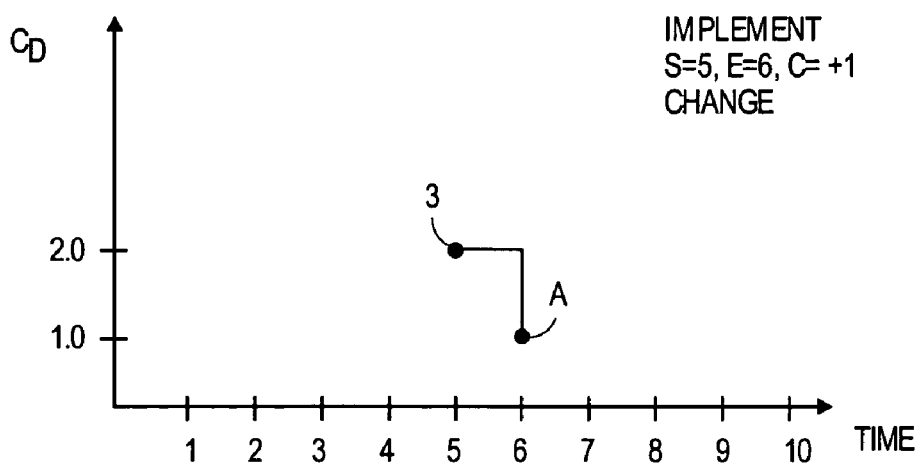

With FIG. 4a representing the understanding of the state of the persisted capacity demand profile $210_1$ after a read 302 of the persisted profile is performed over the [5,6] time interval, FIG. 4b represents the update 303 to be made to the persisted capacity demand profile once change 221 has been accounted for. According to one embodiment, for any s,e,c combination, a change 303 of c is implemented over the time interval [s,e) (i.e., the change is made at s and all points between s and e but is not made at e).

Moreover, if the implementation of a change 303 introduces a new change in the capacity demand profile, a new data point is added to the local capacity demand profile; and/or, if the implementation of a change 303 eliminates a change in the local capacity demand profile, the resultant "redundant" data point is removed from the local capacity demand profile. Examples of both the insertion and removal of data points is described in the examples below.

The change 303 represented by change 221 adds a capacity demand of 1.0 over the [5,6) time interval. FIG. 4b shows the updated local capacity demand profile within the [5,6] time interval after change 221 is effected. Here, the drop at time 6.0 from a capacity demand of 2.0 to a capacity demand of 1.0 represents a new change in the understanding of the capacity demand profile as expressed in FIG. 4a. Therefore new data point A is added 303.

From the perspective of the contents of the local capacity demand profile within local memory 207, with respect to time 5.0, all that was known with respect to FIG. 4a was that the capacity demand profile "changed" to a value of 1.0. It is not known from what value this change was made.

If it was 2.0 (which in fact it was not from simple reference to the capacity demand profile $210_1$ in FIG. 2), then data point 3 would ideally be removed because the introduction of change 221 would make the capacity demand profile constant through time period 5.0. If it was something other than 2.0, then the capacity demand profile still has a change at time 5.0 after change 221 is accounted for and data point 3 should remain. It should be understood that there exist different ways to account for this situation and that the present discussion embraces any of these ways.

For example, according to a first approach, the neighboring data point earlier in time from data point 3 (i.e., data point 2 in capacity demand profile $210_1$) would be read from database 210 (e.g., automatically as part of read 302) so that a change in capacity demand can be verified/dismissed as of the start time "s" of the collision buffer change. According to a second approach, it is understood that no real problem exists in the overall operation of the system of FIG. 2 if a "redundant" data point exists within a capacity demand profile (i.e., if a data point exists where no change occurs). As such, no effort is made to resolve the issue.

According to another approach, the elimination of a redundant data point that was introduced at a collision buffer change start time is performed as part of process 308 (i.e., when database 210 is updated 308 with the contents of the local capacity demand profile 250) by some operational intelligence that exists at database 210 (e.g., Server Query Language (SQL) like database software having SQL like commands) or at local memory 207 (e.g., the scheduler 203). The spirit of the enclosed teachings can embrace any of these approaches. However, the discussion of the present example will embrace the later (i.e., the third approach discussed above). Thus, FIG. 4b represents the proper perspective of the local capacity demand profile 250 once collision buffer change 221 has been fully accounted for.

The next collision buffer change 304 to be implemented is change 222. Change 222 desires to add a new activity (A6) that imposes a capacity demand of 1.0 over a time interval of [3,4). FIG. 5a represents the state of the local capacity demand profile 250 that resides in local memory 207 after the persisted capacity demand profile $210_1$ data within the [3,4] time interval is read 302 from database 210 and added to the prior existing local capacity demand profile of FIG. 4b.

Here, notably, no data point exists at the start time for change 221 (i.e., time 3.0) in the persisted capacity demand profile $210_1$ (because the capacity demand is constant through time 3.0). Thus, if the data read 302 from the persisted profile $210_1$ were actually limited to data no earlier in time than time 3.0, the capacity demand over time interval (3,4) could not be properly understood. As such, when no data point exists at the start time of a collision buffer change, the closest earlier data point from the collision buffer change start time is also read from the persisted capacity demand profile $210_1$.

Referring to the persisted capacity demand profile $210_1$ of FIG. 2, the closest earlier data point to time 3.0 is data point 1 that resides at time 2.0. Thus, in order to process collision buffer change 222, data sufficient to build a complete understanding from time 1.0 to time 4.0 inclusive (i.e., time interval [1,4]) is read 302 from the persisted capacity demand profile 210, and added to the local capacity demand profile perspective of FIG. 4b (i.e., the local capacity demand profile that resulted after change 221 was accounted for). FIG. 5a shows the new transient capacity demand profile that results.

Figure 5B:
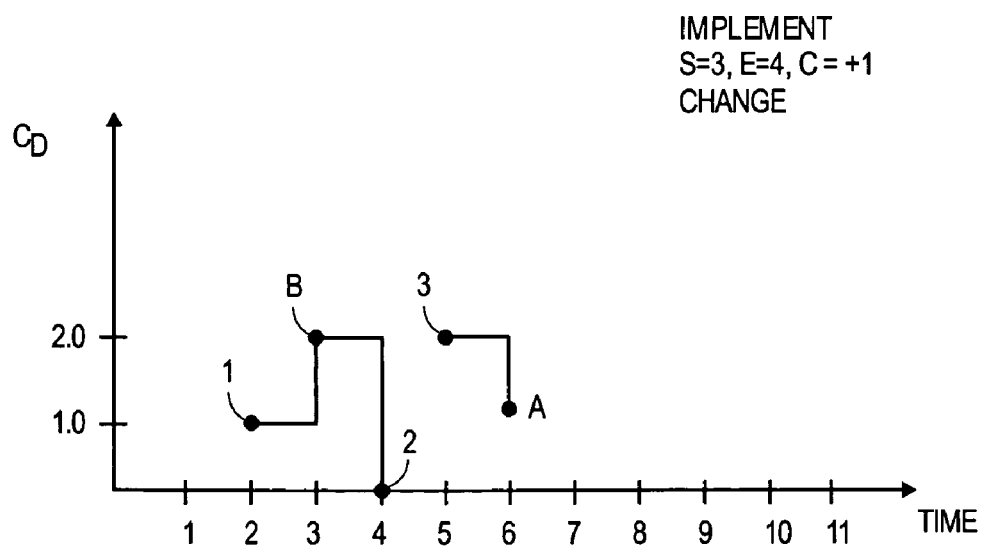

FIG. 5b shows the local capacity demand profile of FIG. 5a after it has been adjusted 303 to account for collision buffer change 222. Specifically, with c=+1.0 for change 222, the capacity demand of FIG. 5b rises to a height of 2.0 over the [3,4) time interval.

The next collision buffer change 304 to be implemented is change 223. Change 223 desires to move the start time of activity A2 from a time of 5.0 to a time of 6.0. As discussed above, this corresponds to imposing a capacity demand change of −1.0 over a time interval of [5,6). Here, note that read 302 is only performed over time intervals that have not already been read from database 210. Because change 221 involved time interval [5,6], no read is performed from database 210. That is, overtime interval [5,6], the local capacity demand profile in local memory 207 is now more accurate than the persisted capacity demand profile $210_1$ in database 210.

As such FIG. 5b continues to represent the proper local capacity demand profile for implementing collision buffer change 223. FIG. 6a shows the local capacity demand profile after the profile of FIG. 5b has been modified 303 to account for collision buffer change 223. FIG. 6a therefore shows a lowering 303 of the height of the profile of FIG. 5b by 1.0 unit over the [5,6) time interval.

Figure 6B:
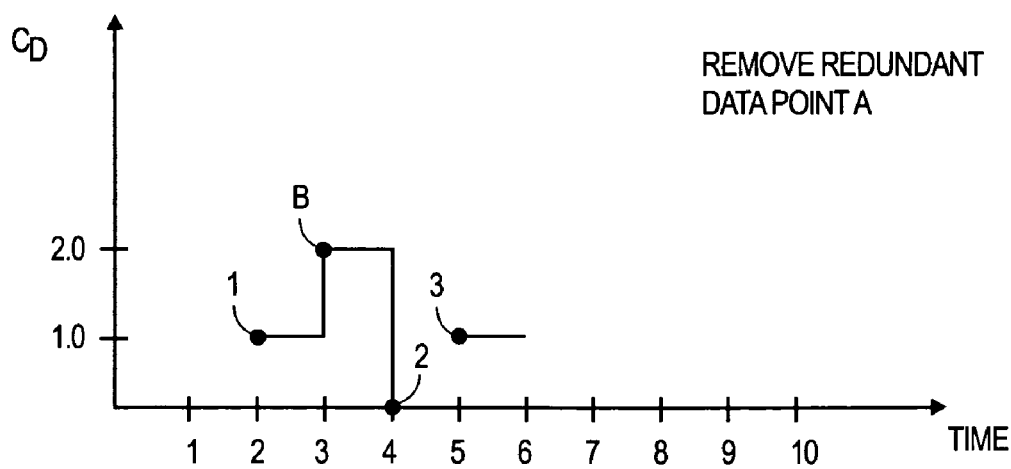

Note that process 303 indicates that any redundant data points that result from implementing a collision buffer change are also removed. Here, FIG. 6a shows that data point A is redundant with respect to data point 3 after collision buffer change 223 has been implemented. That is, data point A no longer represents a change in the capacity demand profile. As such, data point A is also removed from the local capacity demand profile as part of process 303. FIG. 6b shows the contents of the local capacity demand profile after data point A has been removed.

The next collision buffer change 304 to be implemented is change 224. Change 224 desires to remove activity A3 from the set of scheduled activities. Activity A3 imposes a capacity demand of 2.0 over a time interval of [7,8]. Because none of the collision buffer changes accounted for so far (i.e., changes 221 through 223) have covered time interval [7,8], the data covering time interval [7,8] from the persisted capacity demand profile $210_1$ is read 302 from database 210. FIG. 7a shows the addition of this information to the local capacity profile state depicted in FIG. 6b.

Figure 7B:
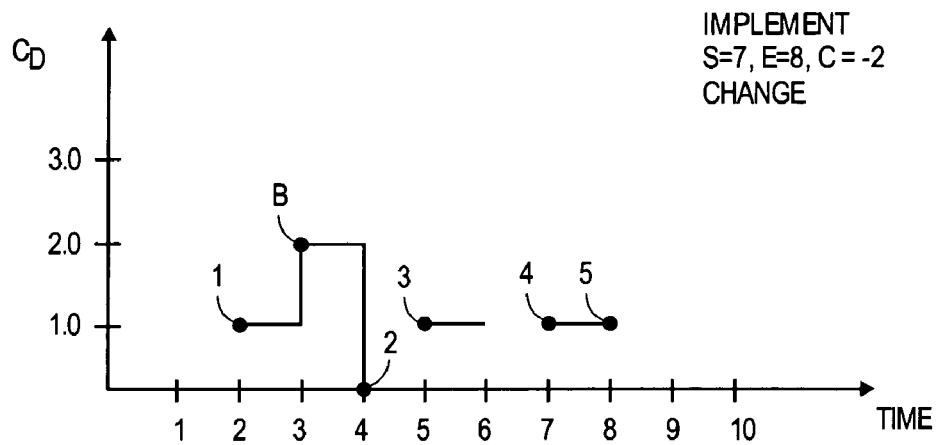
Figure 7C:
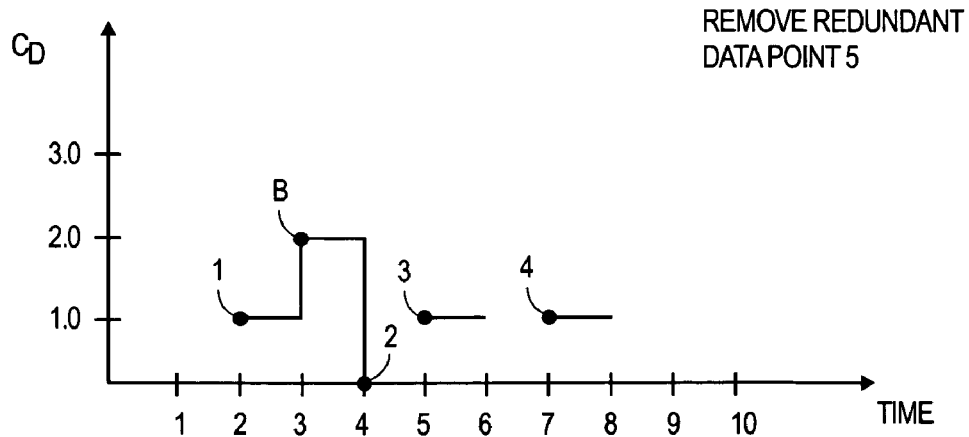

FIG. 7b shows the −2.0 adjustment 303 made to the local capacity profile of FIG. 7a over the [7,8) time interval so as to incorporate change 224 into the profile. Note that incorporation of change 224 makes data point 5 redundant. FIG. 7c shows the new local capacity demand profile that results when redundant data point 5 is removed 303 from the local capacity profile observed in FIG. 7b.

The next collision buffer change 304 to be implemented is change 225. Change 225 desires to change the end time for activity A1 from a time of 4.0 to a time of 3.0. As discussed above, this corresponds to imposing a capacity demand change of −1.0 over a time interval of [3,4). Because change 222 involved time interval [3,4], no read is performed from database 210. That is, FIG. 7c already represents the correct perspective against which to impose change 225.

FIG. 8a shows a change of −1.0 added to the profile of FIG. 7c over the [3,4) time interval and therefore represents the implementation of change 225. Note that data point B has become redundant and is therefore removed as shown in FIG. 8b.

At this point all collision buffer changes have been made. As such, FIG. 8b represents areas of "new information" where the persisted capacity demand profile $210_1$ of FIG. 2 is now stale. Although the sequence of changes 221 through 225 imposes no net change to the persisted capacity demand profile $210_1$ in the time intervals of [3,4] and [5,6], a clear area of inaccuracy in the persisted profile is observed in time interval [7,8] (i.e., the height is correctly 3.0 and not 1.0).

Figure 8B:
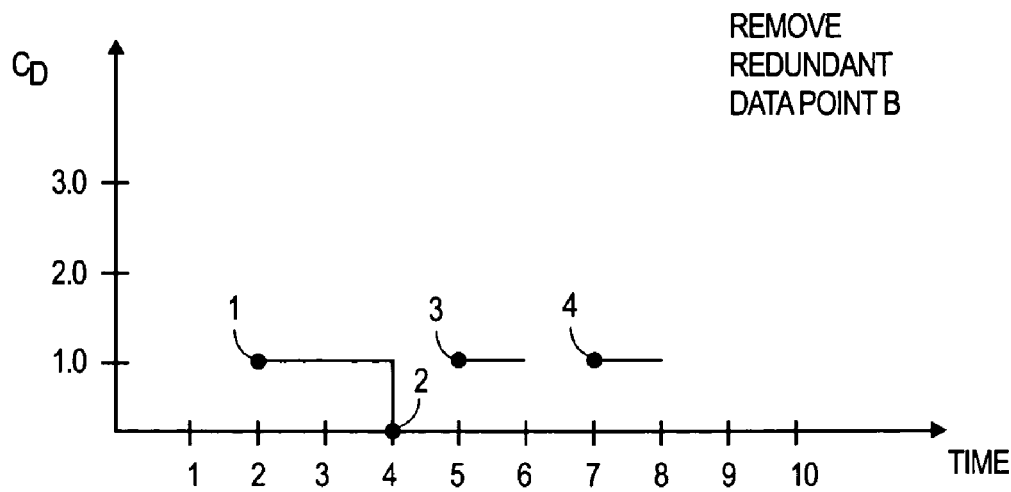

Referring to FIGS. 2 and 3, after the final execution of process 303 has been iterated through to produce the local capacity demand profile observed in FIG. 8b, the local capacity demand profile 250 is deemed "prepared" with the changes 221 through 225 that were submitted by transactions before transaction 233 developed a need for the capacity demand of profile R. Therefore, transaction 233 is now ready to address resource R with all changes that preceded it having been accounted for.

Before continuing with the activity of transaction 233 that concerns the capacity demand profile of resource R, note that collision buffer changes that affect a wide time interval will likely read into local memory 207 a plurality of data points from the persisted file. For example, if the [s,e) interval of change 221 was [1,6) instead of [5,6), the portion of the persisted capacity demand profile $210_1$ read from database 210 would have included data points 0,1,2 and 3.

Also, for any of collision buffer changes that add to the capacity demand of the resource (i.e., for which c is positive), the scheduler 203 should check to confirm that the change does not exceed the maximum capacity demand that the resource can sustain.

In an embodiment, an "overload" profile that represents the maximum capacity the resource can sustain is associated with the resource that the scheduler R refers to. The overload profile may change with time (e.g., by lowering for weekends and holidays and rising for regular work weeks). In an embodiment, if a proposed change from the collision buffer exceeds the maximum capacity demand that the resource can sustain, an alert is raised.

In other or related embodiments, for each transaction that submitted a change to the collision buffer, the transaction is notified whether the change is actually implemented or not. The example discussed above with respect to collision buffer changes 221 through 225 assumes that each of these changes was actually implemented.

Finally, according to an implementation, certain accessing rules may be made to apply for the collision buffer such as: 1) two different transactions may not change the same activity in parallel; and, 2) the collision buffer is only to be used if the persisted capacity demand profile cannot be locked. Other than that, no significant restrictions exist as to the use of the collision buffer.

Read/Write by Owner Transaction

With the local capacity demand profile 250 having been prepared with the changes from the collision buffer 220, transaction 233 is free to attempt any changes of its own volition to the capacity demand of resource R; and/or attempt to read the capacity demand profile of resource R. FIG. 9 discusses an exemplary read. FIG. 10 discusses an exemplary write.

Referring to FIGS. 3 and 9, FIG. 9 shows the contents of the local capacity demand profile 250 if transaction 233 simply attempts to read the capacity demand profile over a time interval of [0,12]. Here, FIG. 8b represents the correct state of the capacity demand profile for resource R over time intervals [2,4], [5,6] and [7,8]. As such, in order to build a complete capacity demand profile over time interval [0,12], only the data from time intervals [0,2), (4,5), (6,7) and (8,12] needs to be read 305 from the persisted capacity demand profile $210_1$ that is stored in database 210 of FIG. 2.

Analysis of the persisted capacity demand profile $210_1$ that is stored in database 210 reveals that: 1) data point 0 exists in time interval [0,2); 2) no data point(s) exist in time interval (4,5); 3) no data point(s) exist in time interval (6,7); and, 4) data points 6, 7 and 8 exist in time interval (8, 12]. Therefore read operation 305 of FIG. 3 will add data points 0, 6, 7 and 8 of the persisted profile $210_1$ to the local capacity demand profile of FIG. 8b. The result is shown in FIG. 9. Transaction 233 simply performs a read of the local capacity demand profile from local memory 207.

FIG. 10a,b shows an example of an attempt by transaction 233 to schedule another activity (A7) upon resource R. The A7 activity is assumed to impose a capacity demand of 2.0 over a time interval of [1,6). If this write 306 were performed after the database read 305 described above with respect to FIG. 9, the local capacity demand profile that would result after the write is observed in FIG. 10b.

By contrast, if this write were performed without the read of FIG. 9 being performed beforehand (i.e., if FIG. 8b represented the state of the local capacity demand profile from which the write is implemented), the database read operation 305 would only attempt to read the persisted capacity demand profile $210_1$ from time intervals [0,2) and (4,5). This would only produce data point 0. FIG. 10a shows the state of the local capacity demand profile in local memory in this case.

After the write 306 of the activity A7 information, the local capacity demand profile in local memory 207 would appear as observed in FIG. 10b.

In an embodiment, processes 305 and 306 iterate 307 for as many reads and writes as transaction 233 desires to perform with respect to resource R. Note that, similar to that described above with respect to the collision buffer changes, any information "already read" from database 210 need not be re-read from database 210.

Referring to FIGS. 3 and 11, FIG. 11 shows the state of the system of FIG. 2, after the persisted capacity demand profile for resource R has been updated 308 with the local capacity demand information that has been built in local memory 207. Specifically, note "new" persisted capacity demand profile $210_2$. Here, after transaction 233 became finished with its use of the local capacity demand information for resource R, database 210 was updated and the lock on the persisted profile is released. Over the course of transaction 233's ownership of the persisted profile, note that other transactions desired to impose changes 226, 227, 228 to the capacity demand of resource R and were forced to submit these changes to the collision buffer 220 as a consequence.

Implementation Notes

It is important to point out that, similar to the discussion provided in the background, database 210 may be an ORDBMS database 210. Here, note that the persisted capacity demand profiles 210 can be implemented as "time sorted" files (i.e., data points are listed sequentially with time), and, any time sorting function that needs to be applied to a capacity demand profile can be easily accomplished in the object oriented environment of the ORDBMS database 210. The collision buffer 220 can also be effectively built into database 210 whether database 210 is an ORDBMS database or otherwise.

The discussion above builds capacity demand profiles forward in time with intervals of the form [s,e). Is it also possible to build capacity demand profiles backward in time with intervals of the form (s,e].

Moreover, the application server upon which scheduler 203 runs may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
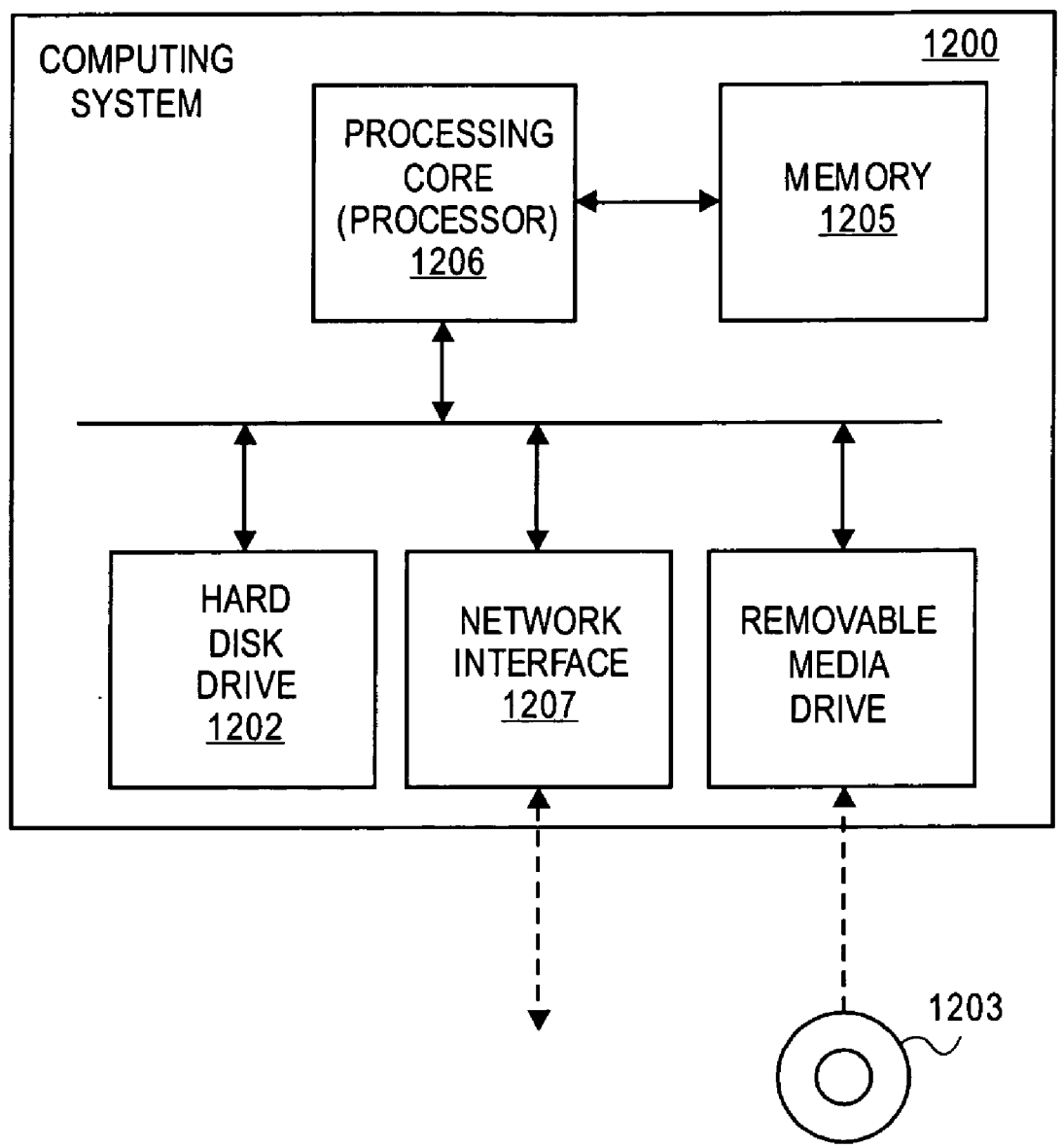
FIG. 12 shows a depiction of a computing system.

FIG. 12 is a block diagram of a computing system 1200 that can execute program code stored by an article of manufacture. It is important to recognize that the computing system block diagram of FIG. 12 is just one of various computing system architectures. The applicable article of manufacture may include one or more fixed components (such as a hard disk drive 1202 or memory 1205) and/or various movable components such as a CD ROM 1203, a compact disc, a magnetic tape, etc. In order to execute the program code, typically instructions of the program code are loaded into the Random Access Memory (RAM) 1205; and, the processing core 1206 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 1206.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    storing in a database one or more changes desired for a capacity demand profile of a resource by one or more transactions that are locked out from using said capacity demand profile;
    after storing said one or more desired changes in said database, locking said capacity demand profile of said resource for use by a transaction while locking out use by other transactions;
    selecting from said database a change that a locked-out transaction desired to implement to said capacity demand profile prior to said locking and that was stored during a prior locking of said capacity demand profile;
    obtaining a portion of said locked capacity demand profile by using one or more processors, said portion describing said capacity demand profile over a time interval in which said locked-out transaction desired to implement said change to said capacity demand profile prior to said locking;
    implementing said change to said portion to form a changed portion; and
    after said implementing, implementing a second change to said changed portion, said second change desired by said transaction.

2. The method of claim 1 wherein said portion does not include any data outside said time interval.

3. The method of claim 1 wherein said portion includes data outside said time interval, said data being only a next data point of said locked capacity demand profile outside an end of said time interval.

4. The method of claim 3 wherein said next data point is only included with said portion because a data point did not exist in said locked capacity demand profile at said end of said time interval.

5. The method of claim 1 wherein said method further comprises:

obtaining a second portion of said locked capacity demand profile after said implementing said change and prior to said implementing said second change, said second portion describing said capacity demand profile over a second time interval in which a second locked-out transaction desired to change said capacity demand profile prior to said locking.

6. The method of claim 5 wherein said second time interval does not overlap said first time interval.

7. The method of claim 5 wherein said method further comprises implementing a change to said second portion to form a second changed portion, said implementing of said change to said second portion being prior to said implementing of said second change desired by said transaction to said changed portion.

8. The method of claim 5 wherein each of said change to said portion, said second change to said changed portion, and a change to said second portion are selected from the group consisting of:
  a) an addition of a scheduled activity to said resource;
  b) a removal of a scheduled activity from said resource;
  c) a change in start time of a scheduled activity on said resource;
  d) a change in end time of a scheduled activity on said resource; and
  e) a change in start time and end time of a scheduled activity on said resource.

9. The method of claim 5 wherein said change from said locked-out transaction and a change from said second locked-out transaction were each specified in a same buffer.

10. The method of claim 1 wherein said method further comprises obtaining a second portion of said locked capacity demand profile after said implementing of said change, said second portion describing said capacity demand profile over a second time interval in which said transaction desires to implement said second change.

11. The method of claim 1, further comprising:
  before storing said one or more desired changes in said database, locking said capacity demand profile for use by a previously locking transaction while locking out use by other transactions; and
  unlocking said capacity demand profile for said previously-locking transaction before locking said capacity demand profile for said transaction.

12. An article of manufacture including a non-transitory machine-readable medium that stores program code which, when executed by a machine, causes the machine to perform a method, the method comprising:
  storing in a database one or more changes desired for a capacity demand profile of a resource by one or more transactions that are locked out from using said capacity demand profile;
  after storing said one or more desired changes in said database, locking said capacity demand profile of said resource for use by a transaction while locking out use by other transactions;
  selecting from said database a change that a locked-out transaction desired to implement to said capacity demand profile prior to said locking and that was stored during a prior locking of said capacity demand profile;
  obtaining a portion of said locked capacity demand profile, said portion describing said capacity demand profile over a time interval in which said locked-out transaction desired to implement said change to said capacity demand profile prior to said locking;
  implementing said change to said portion to form a changed portion; and
  after said implementing, implementing a second change to said changed portion, said second change desired by said transaction.

13. The article of manufacture of claim 12 wherein said locking a capacity demand profile further comprises locking a persisted capacity demand profile stored in a database.

14. The article of manufacture of claim 13 wherein said database is an object relational database system.

15. The article of manufacture of claim 12 wherein said portion does not include any data outside said time interval.

16. The article of manufacture of claim 12 wherein said portion includes data outside said time interval, said data being only a next data point of said locked capacity demand profile outside an end of said time interval.

17. The article of manufacture of claim 16 wherein said next data point is only included with said portion because a data point did not exist in said locked capacity demand profile at said end of said time interval.

18. The article of manufacture of claim 12 wherein said method further comprises:
  obtaining a second portion of said locked capacity demand profile after said implementing said change and prior to said implementing said second change, said second portion describing said capacity demand profile over a second time interval in which a second locked-out transaction desired to change said capacity demand profile prior to said locking.

19. The article of manufacture of claim 18 wherein said second time interval does not overlap said first time interval.

20. The article of manufacture of claim 18 wherein said method further comprises implementing a change to said second portion to form a second changed portion, said implementing of said change to said second portion being prior to said implementing of said second change desired by said transaction to said changed portion.

21. The article of manufacture of claim 18 wherein each of said change to said portion, said second change to said changed portion, and a change to said second portion are selected from the group consisting of:
  a) an addition of a scheduled activity to said resource;
  b) a removal of a scheduled activity from said resource;
  c) a change in start time of a scheduled activity on said resource;
  d) a change in end time of a scheduled activity on said resource; and
  e) a change in start time and end time of a scheduled activity on said resource.

22. The article of manufacture of claim 18 wherein said change from said locked-out transaction and a change from said second locked-out transaction were each specified in a same buffer.

23. The article of manufacture of claim 12 wherein said method further comprises obtaining a second portion of said locked capacity demand profile after said implementing of said change, said second portion describing said capacity demand profile over a second time interval in which said transaction desires to implement said second change.

24. The article of manufacture of claim 12 wherein said change and said second change are each selected from the group consisting of:
  a) an addition of a scheduled activity to said resource;
  b) a removal of a scheduled activity from said resource;
  c) a change in start time of a scheduled activity on said resource; and
  d) a change in end time of a scheduled activity on said resource.

25. The article of manufacture of claim 24 wherein said change is described by:
   a) a first time;
   b) a second time; and
   c) a change to be made to said capacity demand profile.

26. The article of manufacture of claim 25 wherein said first time is a start time, said second time is an end time and said change is to further be made at said start time but not at said end time.

27. The article of manufacture of claim 12 wherein said implementing a second change to said changed portion forms a second changed portion, said method further comprising, after said implementing a second change, updating said locked capacity demand profile with said second changed portion and unlocking said locked capacity demand profile afterward.

28. The article of manufacture of claim 12 wherein said obtaining further comprises reading said portion into a memory local to said transaction.

29. The article of manufacture of claim 28 wherein said transaction is to handle a production order.

30. The article of manufacture of claim 28 wherein said memory keeps said portion while said portion existed and said changed portion.

31. The article of manufacture of claim 30 wherein said implementing a second change to said changed portion forms a second changed portion in said memory, said method further comprising, after said implementing a second change, updating said locked capacity demand profile with said second changed portion and unlocking said locked capacity demand profile afterward.

32. The article of manufacture of claim 31 wherein said locked capacity demand profile is persisted within a database.

33. The article of manufacture of claim 32 wherein said database is an Object-Relational Database Management System (ORDBMS) database.

34. The article of manufacture of claim 12, further comprising:
   before storing said one or more desired changes in said database, locking said capacity demand profile for use by a previously locking transaction while locking out use by other transactions; and
   unlocking said capacity demand profile for said previously-locking transaction before locking said capacity demand profile for said transaction.

35. A computing system comprising a virtual machine, a plurality of processors and instructions disposed on a computer readable medium, said instructions executed by said virtual machine to perform a method, said method comprising:
   storing in a database one or more changes desired for a capacity demand profile of a resource by one or more transactions that are locked out from using said capacity demand profile;
   after storing said one or more desired changes in said database, locking said capacity demand profile of said resource for use by a transaction while locking out use by other transactions;
   selecting from said database a change that a locked-out transaction desired to implement to said capacity demand profile prior to said locking and that was stored during a prior locking of said capacity demand profile;
   obtaining a portion of said locked capacity demand profile, said portion describing said capacity demand profile over a time interval in which said locked-out transaction desired to implement said change to said capacity demand profile prior to said locking;
   implementing said change to said portion to form a changed portion; and
   after said implementing, implementing a second change to said changed portion, said second change desired by said transaction.

36. The computing system of claim 35, wherein said method further comprises:
   before storing said one or more desired changes in said database, locking said capacity demand profile for use by a previously locking transaction while locking out use by other transactions; and
   unlocking said capacity demand profile for said previously-locking transaction before locking said capacity demand profile for said transaction.

* * * * *